United States Patent Office 3,100,788
Patented Aug. 13, 1963

3,100,788
PREPARATION OF SILICON-HYDROGEN COMPOUNDS
Herbert Jenkner, Hannover-Wulfel, Germany, assignor to Kali-Chemie A.G., Hannover, Germany
No Drawing. Filed Oct. 30, 1956, Ser. No. 619,120
Claims priority, application Germany Nov. 2, 1955
3 Claims. (Cl. 260—448.2)

The invention relates to the preparation of silicon-hydrogen compounds.

It is known to prepare such compounds by hydrogenation of silicon halides, partially halogenated silanes or organohalogeno silanes in the presence of metal catalysts, such as aluminum, magnesium, and the like. The use of hydrides, such as LiAlH$_4$ or AlH$_3$, has also been proposed for this purpose.

Said known procedures present certain difficulties. In the first recited method, only very small yields of hydrogenated products could be obtained. Metal hydrides, such as LiAlH$_4$, are so expensive as to render them unsuitable for the commercial production of most silicon compounds.

In accordance with my invention, silicon-hydrogen compounds are readily obtained in almost theoretical yields by reacting compounds of the formulae $$R_xSiHal_y$$

or $$Si_nR_{(2n+2)}O_{n-1}$$

wherein R=alkyl, aryl, aralkyl, or alkoxy, Hal=F, Cl, Br, or I, $x+y=4$, $x=1$, 2, or 3, and $n\geq 2$, with hydrogen in the presence of alkali metals, or with alkali hydrides. The reaction is carried out at elevated temperatures, preferably at temperatures of about 50° to 400° C., and preferably at pressures of about 1 to 350 atm. or more. Dissolving, diluting or suspending agents or mixtures thereof may be present, such as hexane, cyclohexane, octane, benzene, paraffin oil and others non-reacting with sodium.

Whereas in the hydrogenation of halogenated silanes with aluminum, very small yields are obtained, the novel method allows of obtaining yields of 90 percent and more, particularly when organofluosilicon compounds are used as starting materials. Additional advantages of my method are that no, or very few, compounds of Si—Si structure are produced and that the starting materials are cheap and readily available.

It is, of course, also possible to use compounds as starting materials, which, in addition to the reactive groups, contain already hydrogen bound to silicon. Such compounds are represented by the formula $R_xSiHal_yH_z$, wherein R, Hal and H are bound to silicon and $x+y+z=4$, $z$ is 1 or 2 and $y$ 1 or 2.

The obtained silicon-hydrogen compounds may be used, for instance, as reducing agents in organic and inorganic chemistry, as propellants, fuel, as water repellants for textiles, building structures, leather, and the like; they are generally useful wherever it is desired to produce silicone coatings in a neutral medium. The compounds may also be used for the production of silica for various purposes, where the hydrohalic acid generated in the conventional preparation of silica by hydrolysis of halogen compounds would be harmful.

The following examples are given to illustrate the invention. All parts are given by weight, unless indicated otherwise. It may be mentioned that the reaction time depends on the nature of the starting materials and the product aimed at, and is for the ranges given in respect of temperatures and pressures between 0.5 and 5 hours.

Example 1

81 g. of triethylfluorosilane were reacted by shaking or stirring in an autoclave of 250 cc. capacity with 15.3 g. of Na and hydrogen at a total pressure of 131 atm. The temperature was slowly raised to 300° C. and the autoclave was maintained at this temperature for 1 hour. 64 g. of triethylsilane were obtained, which corresponded to a yield of more than 90 percent of the theory.

Example 2

Hydrogen at a total pressure of 136 atm. was pressed into a V4A shaking autoclave containing 39 g. of diethyldifluorosilane and 8 g. of sodium. Reaction time 2.5 hours; maximum temperature 290° C.

27.8 g. of a product were obtained which consisted of 93 percent of $(C_2H_5)_2SiH_2$ and 7 percent of $(C_2H_5)_2SiF_2$. If this product was again subjected to the same hydrogenation treatment, the yield of diethylsilane was quantitative; it did no longer contain any fluorine.

The same result was obtained in a single step when the reaction was carried out in octane as solvent.

Example 3

Hydrogen of 130 atm. was pressed in an autoclave on 70 parts of trimethylchlorosilane and 19 parts of sodium. Reaction time 3.5 hours; maximum temperature 280° C. The reaction product consisted of 30 parts of trimethylsilane and 4 parts of unreacted trimethylchlorosilane.

If the reaction was carried out in the presence of octane, the yield of trimethylsilane rose to more than 90 percent.

If, instead of trimethylchlorosilane, triphenylchlorosilane is reacted the reaction will be the same according to Example 3 with nearly an equimolar quantity of sodium and hydrogen.

Example 4

Hydrogen was pressed at 90 atm. into a steel autoclave containing 465 parts of hexamethyl disiloxane and 60 parts of sodium. Reaction time 2.5 hours; maximum temperature 255° C.; maximum pressure 196 atm. The hydrogenation started after the autoclave had been heated to a temperature of 160–180° C.; after cooling and release of the pressure, 207 parts of trimethylsilane were obtained.

Example 5

In a shaking-autoclave 1.5 mol (186 g., corresponding to a multiple surplus) of diethyldifluorosilane was pressed to one mole (24 g.) of finely divided sodium hydride. Then the reaction mixture was heated under stirring for 2 hours to 280–320° C. The diethylsilane-diethylfluorosilane mixture then was distilled off, a white powder remaining as residue in the reaction vessel. The reaction referred to the applied sodium hydride was 80%. There was no separation of Si. The diethylsilane-diethylfluorosilane mixture produced in the first stage can be reacted again with sodium hydride, so that in the last effect diethylsilane free of fluor is obtained.

Example 6

A mixture of 38 g. of diethoxydichlorosilane (prepared of 21 g. tetraethoxysilane and 17 g. silicon tetrachloride) and 5.2 g. sodium hydride in 50 cc. of octane was heated for one hour from 250 to 320° C. 2.6 g. monosilane was obtained which corresponded to a yield of more than 80% of the theory. If instead of diethoxydichlorsilane diethoxydifluorosilane is used, the yield of monosilane is better.

I claim:
1. A method of preparing silicon-hydrogen compounds, comprising reacting a compound selected from the class consisting of

$$R_xSiHal_y$$

and $$Si_nR_{(2n+2)}O_{n-1}$$

wherein R is a member of the group consisting of alkyl, aryl, aralkyl, alkoxy, Hal is halogen, $x+y=4$, $x$ is an integer between 1 and 3, $n \geq 2$, with hydrogen in the presence of sodium metal at temperatures of about 50° to 400° C. and pressures of about 1 to 350 atm.

2. The method as defined in claim 1, wherein the reaction is carried out in the presence of a diluent.

3. A method of preparing silicon-hydrogen compounds which comprises heating a compound selected from the class consisting of $$R_xSiHal_y$$

and $$Si_nR_{(2n+2)}O_{n-1}$$

wherein R is a member of the group consisting of alkyl, aryl, aralkyl, alkoxy, Hal is halogen, $x+y=4$, $x$ is an integer from 1 to 3, $n \geq 2$, at a temperature of about 50° to 400° C. with sodium under a hydrogen pressure of about 100 to 350 atm.

References Cited in the file of this patent

UNITED STATES PATENTS

| | | |
|---|---|---|
| 2,406,605 | Hurd | Aug. 27, 1946 |
| 2,576,311 | Schlesinger et al. | Nov. 27, 1951 |
| 2,595,620 | Wagner et al. | May 6, 1952 |
| 2,759,007 | Dunham et al. | Aug. 14, 1956 |

OTHER REFERENCES

Kipping et al.: "Jr. Chem. Soc.," vol. 133 (1930), p. 1029–32.

Finholt et al.: "Jr. Am. Chem. Soc." vol. 69 (1947), p. 2692–6.